United States Patent
Balandin et al.

(10) Patent No.: US 8,743,865 B2
(45) Date of Patent: Jun. 3, 2014

(54) AGGREGATION OF VCI ROUTING TABLES

(75) Inventors: Sergey Balandin, Helsinki (FI); Michel Gillet, Helsinki (FI)

(73) Assignee: Nokia Corporation, Espoo (FI)

(*) Notice: Subject to any disclaimer, the term of this patent is extended or adjusted under 35 U.S.C. 154(b) by 717 days.

(21) Appl. No.: 11/714,129

(22) Filed: Mar. 6, 2007

(65) Prior Publication Data

US 2007/0211731 A1    Sep. 13, 2007

Related U.S. Application Data

(60) Provisional application No. 60/778,849, filed on Mar. 6, 2006.

(51) Int. Cl.
- *H04L 12/28* (2006.01)
- *H04L 12/66* (2006.01)
- *H04L 12/50* (2006.01)
- *H04L 12/56* (2006.01)

(52) U.S. Cl.
USPC ........... 370/351; 370/357; 370/358; 370/359; 370/360; 370/396; 370/397; 370/398; 370/399

(58) Field of Classification Search
USPC ........................................................... 370/351
See application file for complete search history.

(56) References Cited

U.S. PATENT DOCUMENTS

| | | | |
|---|---|---|---|
| 5,568,475 A * | 10/1996 | Doshi et al. ................... | 370/399 |
| 6,055,561 A | 4/2000 | Feldman et al. | |
| 6,069,889 A * | 5/2000 | Feldman et al. ............... | 370/351 |
| 6,683,874 B1 | 1/2004 | Nagami et al. | |
| 2002/0114276 A1* | 8/2002 | Basturk ......................... | 370/230 |
| 2002/0172203 A1* | 11/2002 | Ji et al. .......................... | 370/392 |
| 2003/0182445 A1 | 9/2003 | Smith et al. | |
| 2004/0062198 A1* | 4/2004 | Pedersen et al. .............. | 370/229 |
| 2004/0068589 A1* | 4/2004 | Witkowski et al. ........... | 709/249 |
| 2005/0066053 A1* | 3/2005 | McDysan ...................... | 709/243 |
| 2006/0088031 A1* | 4/2006 | Nalawade ..................... | 370/390 |

FOREIGN PATENT DOCUMENTS

| | | |
|---|---|---|
| WO | 9923853 A1 | 5/1999 |
| WO | WO 02/19624 A2 | 3/2002 |

OTHER PUBLICATIONS

Boustead, Paul et al., "*Label Switching and IP Version 6*", IEEE 1998, pp. 561-565.
Widjaja, I., "*Performance Issues in VC-Merge Capable ATM LSR's*", RFC 2682, Sep. 1999, pp. 1-12.
"*Tag Switching*", Internet Technology Overview, Jun. 1999, pp. 23-1-23-8.

(Continued)

*Primary Examiner* — Marcus R Smith
*Assistant Examiner* — Lonnie Sweet
(74) *Attorney, Agent, or Firm* — Squire Sanders (US) LLP (57) ABSTRACT

The present invention provides, according to one example, a method of route aggregation in a network. The network may include at least two switches connected by a link. The method includes the steps of arranging virtual connection identifiers (VCIs) into groups based on a common prefix. Each of the groups corresponds to an outgoing port of a next switch. The method further includes the steps of allocating a VCI at the incoming port of the next switch, and informing the outgoing port of the previous switch of the allocated VCI number. The step of arranging may include splitting all available VCIs into N subgroups, where N is the number of outgoing ports on the switch on the other end of the link.

14 Claims, 5 Drawing Sheets

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | Destination address | | | | | | | | Dst VCI group ID | | | | Src VCI group ID | | | |

(56) References Cited

OTHER PUBLICATIONS

International Search Report PCT/IB2007/000520 filed Mar. 6, 2007.
"Tag Switching", Internetworking Technology Overview, Jun. 1999, Chapter 23, pp. 1-8.
I. Widjaja et al., "Performance Issues in VC-Merge Capable ATM LSRs", Sep. 1999, pp. 1-12, The Internet Society (1999).
Korean Non-Final Office Action, dated Jun. 30, 2010.
Chinese Office Action, dated Jul. 3, 2012; Issued on corresponding Application No. 200780007786.8.
Chinese Office Action for Application No. 200780007786.8, issued Aug. 2, 2011.
Nancy Feldman and Arun Viswanathan, ARIS Specification, Internet Engineering Task Force, IETF, Mar. 1997, pp. 1-43, Retrieved from the internet: <draft-feldman-aris-spec-00.txt> on Feb. 2, 2011.
Yakov Rekhter et al., "Tag Switching Architecture," Jun. 19, 1998, pp. 1-9, Retrieved from the internet: <cisco.com/warp/public/732/tag/tagsw_ov.htm> on Feb. 2, 2011.
Sergey Balandin, "Automatic Route Aggregation for Increasing Performance of the Fault Tolerant Networks," Proceedings of the International Society for Optical Engineering (SPIE), SPIE, Oct. 26, 2004, pp. 13-24, vol. 5598.
Supplementary European Search Report, European Patent Application No. EP 07 70 5666, Date of Completion of the Search: Dec. 21, 2010, Date of Mailing: Dec. 29, 2010, pp. 1-13.
Office Action dated Apr. 10, 2013 issued in corresponding IN Patent Application No. 4310/CHENP/2008.

* cited by examiner

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_DL | | | | | | | | ID | | | Parameter | | | | |

Fig. 1

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 0 | Destination address ||||||||| Dst VCI group ID |||| Src VCI group ID ||||

Fig. 2

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | VCI group prefix ||||||| | R | Prefix length ||| VCI group ID ||||

AGGREGATION OF VCI ROUTING TABLES

CROSS REFERENCE TO RELATED APPLICATIONS

This application claims priority of U.S. Provisional Patent Application Ser. No. 60/778,849, filed on Mar. 6, 2006. The subject matter of this earlier filed application is hereby incorporated by reference.

BACKGROUND OF THE INVENTION

1. Field of the Invention

The present invention relates to communications systems or networks and, more specifically, to a route aggregation method and system which may be used, for example, in conjunction with MIPI/UniPRO and Discobus networks.

2. Description of the Related Art

A communication system may simply be considered a facility which enables communication between two or more entities such as a communications device or user equipment (UE) and/or other nodes associated with the system. The communication may include, for example, communication of voice, data, multimedia, etc. Furthermore, communication systems may support wireless and wire lined communications between wireless and/or wire lined communication devices. Examples of these communication systems include cellular telephone systems, the Internet, and point-to-point in-home wireless networks. Each type of communication system is constructed, and hence operates, in accordance with one or more communication standards.

Communication systems may be circuit switched or packet switched. Examples of circuit switched networks include the telephone network and wavelength routing optical network. Examples of packet switched networks include Internet Protocol (IP), Asynchronous Transfer Mode (ATM), frame relay, and Multi Protocol Label Switching (MPLS).

Two distinct techniques may be used in packet switched communications systems for transferring data, the connection-oriented method and the connectionless method. The connection-oriented method requires a session connection be established before any data can be sent. The connection-oriented method is referred to as a "reliable" network service, because it can guarantee that data will arrive in the same order. Connection-oriented services set up virtual links between end systems through a network. ATM, frame relay, and MPLS are examples of connection-oriented networks.

The connectionless method does not require a session connection between sender and receiver. The sender simply starts sending packets to the destination. Connectionless communication does not have the reliability of the connection-oriented method, but it is useful for periodic burst transfers. IP is an example of a connectionless network.

As mentioned above, connection-oriented networks require that a virtual circuit or connection be established prior to the transfer of data. Therefore, a connection must first be established between the network nodes, the data is then transferred and the connection is disconnected thereafter. Two types of connections are possible: virtual channel connections (VCC) and virtual path connections (VPC). A virtual connection identifier (VCI), which is a header subfield, may be used in setting up the virtual connections. In connection-oriented networks, each connection is characterized by a VCI which is assigned at call set up.

SUMMARY OF THE INVENTION

According to an embodiment of the present invention, a method of route aggregation in a network is provided. The network may include at least two switches connected by a link. The method includes arranging virtual connection identifiers (VCIs) into groups based on a common prefix. Each of the groups corresponds to an outgoing port of a next switch. The method further includes allocating a VCI at the incoming port of the next switch, and informing the outgoing port of the previous switch of the allocated VCI number. The arranging may include splitting all available VCIs into N subgroups, where N is the number of outgoing ports on the switch on the other end of the link.

According to another aspect of the invention, a communications system including at least two network switches connected by a link is provided. The communications system includes means for arranging virtual connection identifiers (VCIs) into groups based on a common prefix, where each of the groups corresponds to an outgoing port of a next switch. The system further includes means for allocating a VCI at the incoming port of the next switch, and means for informing the outgoing port of the previous switch of the allocated VCI number.

Embodiments of the invention also provide a communication system including at least two network switches connected by a link. The at least two network switches may include an arranging unit configured to arrange virtual connection identifiers into groups based on a common prefix, an allocating unit configured to allocate a virtual connection identifier at an incoming port, and an informing unit configured to inform an outgoing port of a previous network switch of the allocated virtual connection identifier number.

According to another example of the invention, a network switch is provided. The network switch includes an arranging unit configured to arrange virtual connection identifiers into groups based on a common prefix, an allocating unit configured to allocate a virtual connection identifier at an incoming port, and an informing unit configured to inform an outgoing port of a previous network switch of the allocated virtual connection identifier number.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The present invention provides, according to one embodiment, a route aggregation method and system. Generally, route aggregation may be considered a method of generating a more general route from a source to a destination given the presence of a specific route. The method and system of the present invention may be used, for example, in conjunction with MIPI/UniPRO and Discobus networks.

More specifically, the present invention allows for the reduction in size of the VCI routing tables on the input ports of a network switch. As a result, routing procedures are simplified and processing speed is increased on the switch. Additionally, the invention allows for a decrease in implementation complexity of the protocol stacks. The invention also provides a definition of a signaling scheme that may be extended to complete a dynamic routing scheme.

According to prior art solutions, the full size VCI routing tables are implemented at every input port of the switch. Such a solution costs a considerable number of gates and leads to the introduction of additional processing delay in packet routing. The drawbacks becomes even more critical when the size of VCI field exceeds a threshold that can be treated using a static full size VCI routing table, thereby producing a need for a dynamic VCI routing table.

Therefore, there is a need for a route aggregation procedure which increases the speed of the routing decision procedure. The present invention provides such an improved route aggregation procedure.

As mentioned above, according to prior art solutions, each incoming port of the switch has a VCI routing table for each priority in order to forward packets to the correct outgoing ports. In addition, the switch performs mapping of the incoming VCIs to the outgoing VCI. According to embodiments of the present invention, however, the full size VCI routing tables (the size of the routing tables depends on the VCI length, for 8-bits VCI the table consists of 256 records) allocated for each priority level at each input port of the switch are replaced with the aggregated routing tables, which have sizes that are equal to a number of output ports of the switch. The mapping procedure for incoming to outgoing VCIs is also improved. The route aggregation solution of the present invention is particularly useful as the size of the VCI field grows.

Normally, the Virtual Connection Identifiers (VCI) are assigned to the circuit switching connection independently at each link as a part of the connection establishment procedure. As a result, the VCI has link local meaning, which allows for more efficient use of VCI space since there is no need to maintain global uniqueness of the VCIs.

For every connection-oriented packet, the incoming port of each network switch performs the following two activities: defines the next outgoing port using a VCI routing table, and translates the VCI to the new ID used at the following link using the VCI translation table. The information for VCI routing and translation tables is generated as a part of the connection establishment mechanism. When the connection allocation packet enters a new switch, it registers the new VCI at the incoming port. Based on the target address and local routing table, the correct outgoing port for the VCI is assigned in the VCI routing table. Further, based on availability of VCIs for the next hop, an adjacent VCI is assigned in the VCI translation table. If these operations are successful, the connection allocation packet is forwarded further and the allocation acknowledgment packet is sent back guaranteeing reliability of the connection allocation procedure.

In view of the above, the impact zone of the one step of the VCI allocation process is limited by a switch and the previous hop link. Therefore, in order to significantly reduce the size of the VCI routing table, embodiments of the present invention replace the per-VCI routing by a routing per-group of VCIs. In addition, embodiments of the present invention provide Datalink signaling frames for synchronizing VCI subgroups on the outgoing and incoming ports of the same link, and for modifying list of adjacent destination with the VCI groups.

Traditionally, the connection establishment procedure at each switch allocates a new VCI by taking the first unused VCI number from the general list of unused VCIs on the corresponding outgoing port, and adding the corresponding routing record into the VCI routing table of the incoming port (from which the packet has arrived). According to embodiments of the present invention, the VCI is selected based on the routing decision for the flow at the next switch. Thus, the VCIs are arranged into groups based on a common prefix, where each group corresponds to one outgoing port of the next switch. The groups are arranged in this manner by splitting the whole set of available VCIs (excluding VCIs that are reserved for other purposes, e.g. signaling channel VCIs, reverse direction VCIs, etc.) into N subgroups, where N is the number of outgoing ports on the switch on the other end of the link (by definition N is equal to one if the node at the other end of the link is end point). Depending on the configuration, the number of subgroups N might be equal to the number of output ports minus one, when routing to the pair outgoing port of the incoming port is not allowed (the switch cannot route packet back to the node from which it received the packet), or plus one if the switch supports a local output port, e.g. as a default routing port or for internal controlling purposes.

As discussed above, each VCI group is associated with an outgoing port of the next switch and is used for grouping connections. Additionally, destination addresses have the same routing solution on the next switch. Such an association is performed on the next switch, and, therefore, the VCI allocation is made at the incoming port of the next switch (which contains the required routing information). After that, the outgoing port of the previous switch is informed about the allocated VCI number. Also, the VCI allocation and creation of the VCI translation record is performed when the VCI allocation at the next hop is successful.

Figure 4:
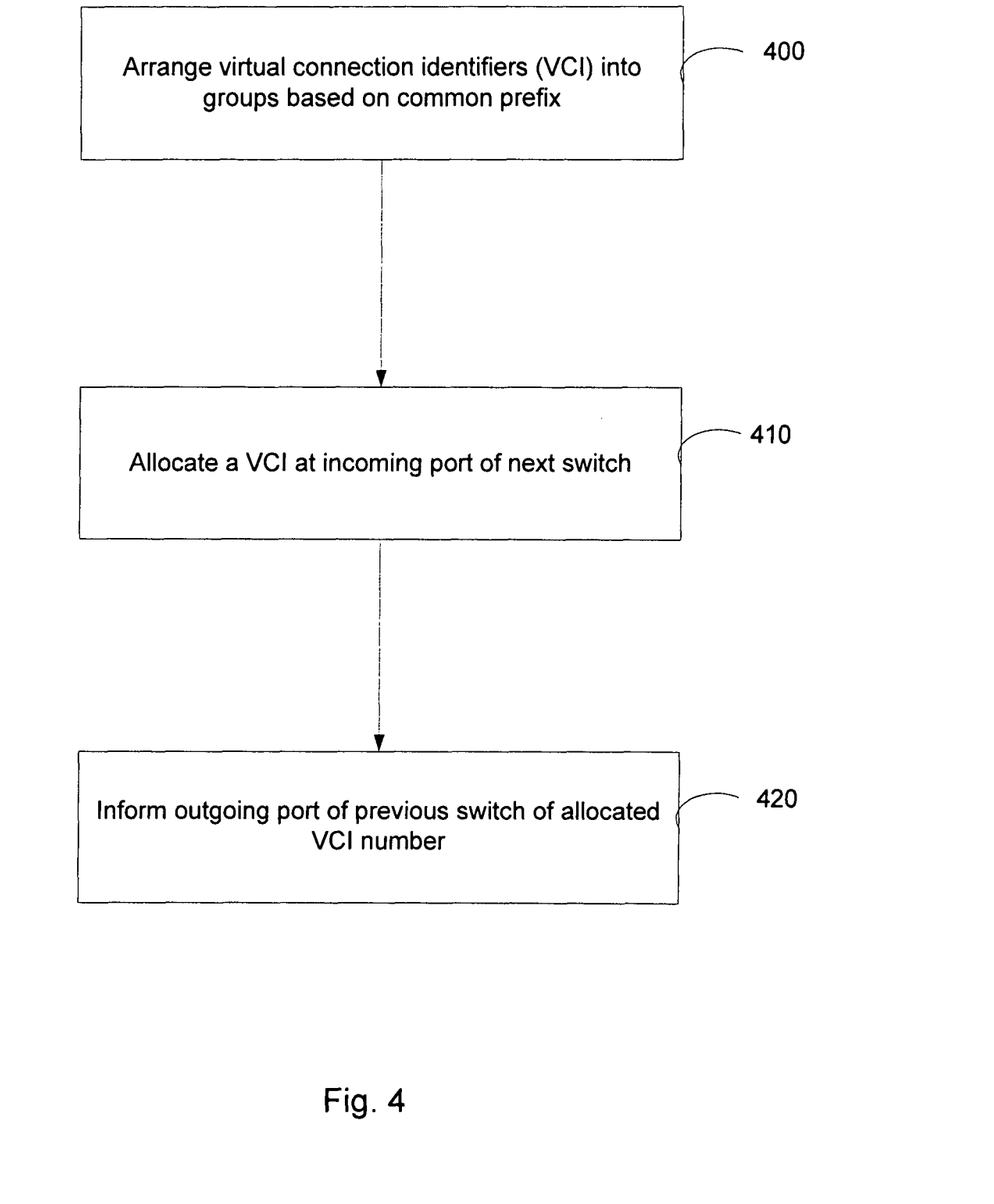
FIG. 4 illustrates a method according to an embodiment of the invention.

FIG. 4 illustrates a method of route aggregation in a network according to one embodiment of the invention. The method includes the step of arranging virtual connection identifiers (VCIs) into groups based on a common prefix 400. Each of the groups corresponds to an outgoing port of a next switch. The method further includes the steps of allocating a VCI at the incoming port of the next switch 410, and informing the outgoing port of the previous switch of the allocated VCI number 420. As discussed above, the step of arranging may include splitting all available VCIs into N subgroups, where N is the number of outgoing ports on the switch on the other end of the link.

It is important to note that a main attribute of each VCI routing group is a unique common prefix, which covers only the VCIs belonging to that group. The VCI groups might be of different size, where the size can be easily defined based on the length of the group common prefix. According to one aspect of the invention, the group prefix is static. However, according to another aspect of the invention, the group prefix may include configurable parameters which are set at the network boot time and can be modified using Datalink signaling frames.

Figure 5:
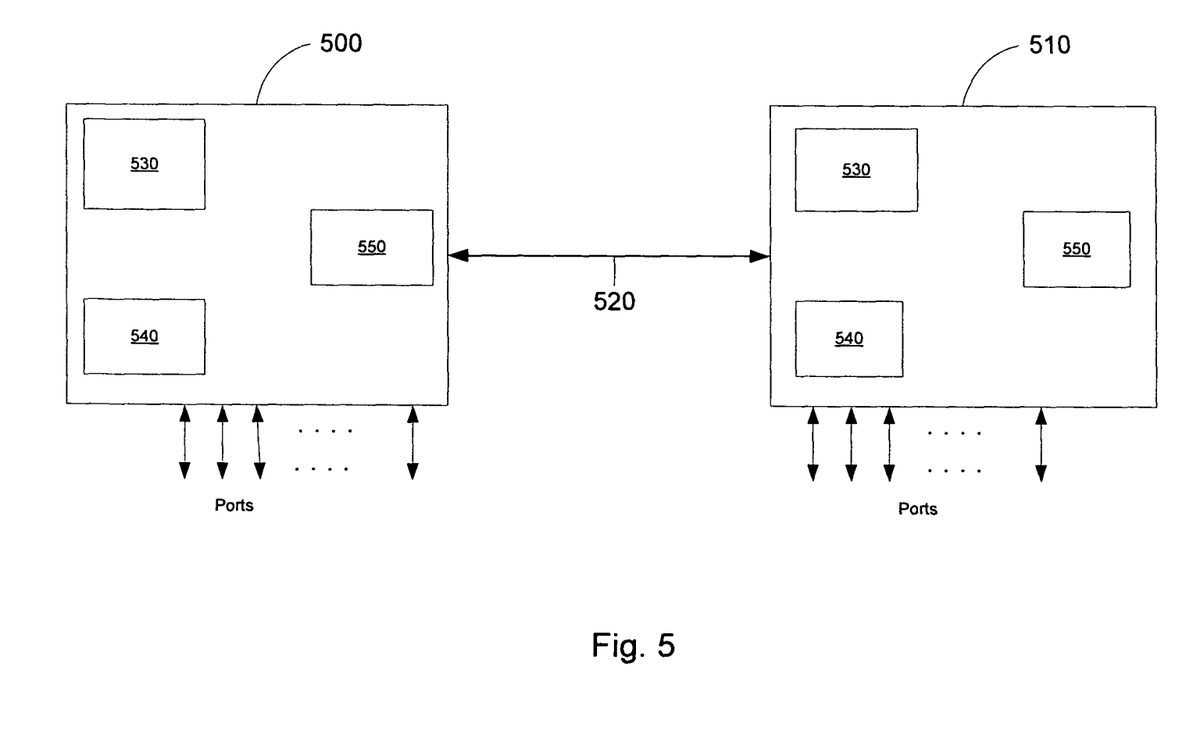
FIG. 5 illustrates a system according to one embodiment of the invention.

FIG. 5 illustrates a communications system, according to one example of the invention, including at least two network switches 500, 510 connected by a link 520. The network switch 500 includes an arranging unit 530 configured to arrange virtual connection identifiers (VCIs) into groups based on a common prefix, where each of the groups corresponds to an outgoing port of the next switch 510. The next switch 510 may include an allocating unit 540 configured to allocate a VCI at its incoming port, and an informing unit 550 configured to inform the outgoing port of the previous switch 500 of the allocated VCI number. Although FIG. 5 only illustrates two network switches, any number of network switches may be utilized according to the invention.

Implementation of the present invention obviates the need for a full-size VCI routing table, and instead allows for the utilization of the VCI routing table that consists of N VCI aggregates. Each aggregate may represent one of the VCI groups and has an outgoing port of the switch associated with it.

Additionally, for situations where the total VCI length minus the length of the VCI group prefix is bigger than the shortest prefix on which differentiation of the target addresses adjacent to the VCI group can be performed, the values of the shortest prefixes can be used in the VCI allocation to associate the preferred tail part of the VCIs of the flows with a given destination. Then, this tail part of the VCI might be used for aggregating the VCI translation table, using the same principle as is used in prefix-based aggregation of VCI routing tables. Essentially, in the VCI translation table, the VCI numbers with the same tail can be aggregated by one translation record that defines the new VCI value as a swap of the original prefix and tail of the original one. That guarantees that VCIs to the same destination will have the same prefix (will belong to the same group), while at the same time they all will have unique numbers.

As discussed above, embodiments of the present invention provide two new optional types of Datalink signaling frames. The first type of frame is used for informing switches about changes in the list of destinations for a given port. These Datalink signaling frames are originated by the incoming port of one switch and targeted to the outgoing port of another switch.

The second type of frame is used for informing downstream switches about changes to the VCI group prefix and the prefix size. These Datalink signaling frames are always originated by the incoming port of a switch, which run out of the VCIs for some VCI group, and are targeted to the outgoing port of a switch with which the new boundaries have to be synchronized. This type of signaling frame is needed only if there is risk that the original allocation of the VCI group size was incorrect, which is possible in highly dynamic environments.

The encoding of new signaling frames can be done by using one of the reserved codes, e.g. UniPro character code 00000001 & ID=111, or by using Datalink layer management frames (DMF control symbol), for the UniPro versions that support it.

Figure 1:
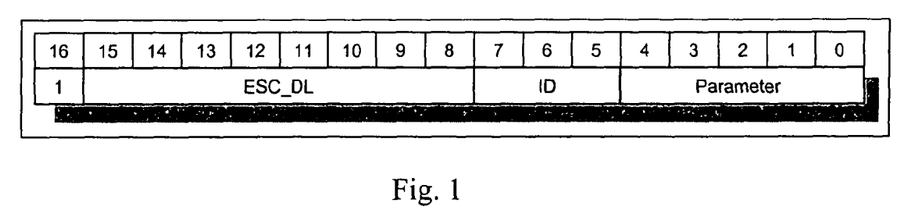
FIG. 1 illustrates a layer control symbol according to one embodiment of the invention.

The new types of signaling frames include the standard heading control symbol illustrated in FIG. 1, and one data symbol of payload.

Figure 2:
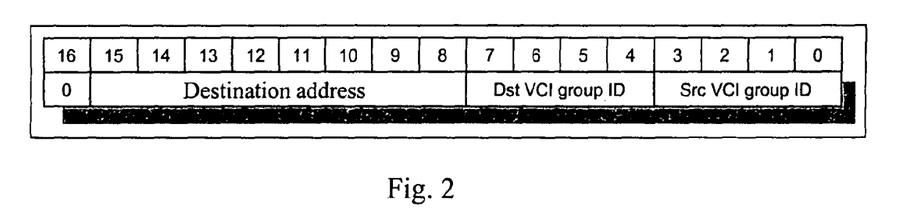
FIG. 2 illustrates a payload data symbol according to one embodiment of the invention.

A control symbol is used for detecting what type of signaling frame is received. Whether the new ID (e.g. equal to 111) or DMF ID is used, the final differentiation between signals is performed using the parameter field, where one of the values is reserved for signal "change in the list of destinations," and another value is reserved for signal "change of the VCI group size and prefix." The payload data symbol of "change in the list of destinations" signal is shown in FIG. 2.

According to an embodiment of the invention, the signal payload may include 3 fields: destination address (8 bits), destination VCI group ID (4 bits), and source VCI group ID (4 bits). The destination address is a subject of the change in the list of destinations on the switch. The source VCI group ID refers to the group to which the specified address originally belonged. The destination VCI group ID specifies the new VCI group for the connections to the address. According to one example of the present invention, the total number of allowed VCI groups is 14 (which is more than enough, taking into account that the target number of groups is equal to the number of outgoing ports of the switch, and each traffic class has its own set of VCI groups), and group number 0 and number 15 are reserved for special purposes. Group 0 may be reserved for switch local purposes, including default routing, and VCI group 15 for "inactive VCI group" state. Therefore, when a completely new destination address is added to the group, the source VCI group ID is 15, and when a certain address is removed from all groups, the destination VCI group ID is set to 15.

Figure 3:
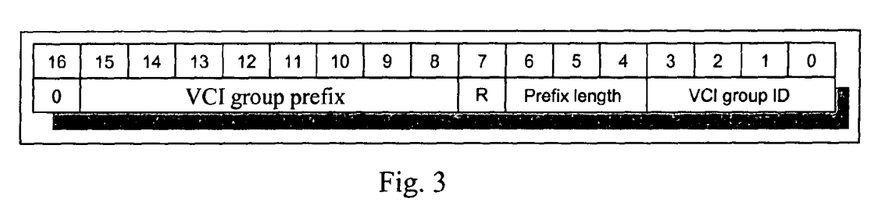
FIG. 3 illustrates a payload data symbol according to another embodiment of the invention.

It is important to note that, in response to the receipt of the change in the list of destinations signal, a switch makes a corresponding VCI reallocation (moves the corresponding VCIs from the source VCI group to the destination group, or delete VCIs if the corresponding target address in not longer available). Depending on the implementation of the VCI groups synchronization mechanism, it also might lead to the generation of the "change of the VCI group size and prefix" signal. The payload data symbol of "change of the VCI group size and prefix" signal is illustrated in FIG. 3.

The signal payload may include 4 fields: VCI group prefix (8 bits), length of the VCI group prefix, which explicitly defines a new size of the VCI group (4 bits), ID of the corresponding VCI group (4 bits), and bit 7 is reserved for further use. Based on the VCI group prefix definition, the minimal size of the VCI group (the VCI group unit) in UniPro version 1.0 is 1 VCI, and in UniPro version 2.0 is 16 VCIs. The total number of VCI group units is 256, which gives enough flexibility for arranging VCIs into groups. The prefix length varies between 0 and 8, and correspondingly the group size varies from 16 to 4096 VCIs. The VCI group ID defines the target VCI group.

Enabling of the new types of Datalink signaling, discussed above, may be performed by setting the corresponding parameters on the selected incoming and outgoing ports of the switches.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method comprising:
   providing route aggregation in a network comprising at least two network switches connected by a link;
   arranging, by at least one of the at least two network switches, virtual connection identifiers into groups based on a common prefix, wherein each of the groups corresponds to an outgoing port of a next network switch and routing of data is performed per group of virtual connection identifiers;
   allocating, by at least one of the at least two network switches, a virtual connection identifier at an incoming port of the next network switch;
   informing, by at least one of the at least two network switches, an outgoing port of a previous network switch of the allocated virtual connection identifier number;
   assigning, by at least one of the at least two network switches, each of the virtual connection identifier groups a unique common prefix; and
   defining, by at least one of the at least two network switches, a size of the virtual connection identifier groups based on a length of the unique common prefix,
   wherein the unique common prefix is static or includes configurable parameters that are set at network boot time.

2. The method of claim 1, wherein the arranging comprises dividing the virtual connection identifiers into n subgroups, wherein n is a number of outgoing ports on the next network switch.

3. A system comprising:
   at least two network switches connected by a link,
   wherein the at least two network switches comprise
      an arranging unit configured to arrange virtual connection identifiers into groups based on a common prefix, wherein routing of data is performed per group of virtual connection identifiers,
      an allocating unit configured to allocate a virtual connection identifier at an incoming port, and
      an informing unit configured to inform an outgoing port of a previous network switch of the allocated virtual connection identifier number,
      wherein each of the virtual connection identifier groups are assigned a unique common prefix, and
      wherein a size of the virtual connection identifier groups are defined based on a length of the unique common prefix.

4. The system of claim 3, wherein each of the groups corresponds to an outgoing port of a next network switch.

5. The system of claim 4, wherein the virtual connection identifiers are divided into n subgroups, n being a number of outgoing ports on the next network switch.

6. The system of claim 3, wherein the unique common prefix is static.

7. The system of claim 3, wherein the unique common prefix includes configurable parameters.

8. An apparatus comprising:
   an arranging unit configured to arrange virtual connection identifiers into groups based on a common prefix, wherein routing of data is performed per group of virtual connection identifiers;
   an allocating unit configured to allocate a virtual connection identifier at an incoming port; and
   an informing unit configured to inform an outgoing port of a previous network switch of the allocated virtual connection identifier number,
   wherein each of the virtual connection identifier groups are assigned a unique common prefix, and
   wherein a size of the virtual connection identifier groups are defined based on a length of the unique common prefix.

9. The apparatus of claim 8, wherein each of the groups corresponds to an outgoing port of a next network switch.

10. The apparatus of claim 9, wherein the virtual connection identifiers are divided into n subgroups, n being a number of outgoing ports on the next network switch.

11. The apparatus of claim 8, wherein the unique common prefix is static.

12. The apparatus of claim 8, wherein the unique common prefix includes configurable parameters.

13. A system comprising:
   providing means for providing route aggregation in a network comprising at least two network switches connected by a link;
   arranging means for arranging virtual connection identifiers into groups based on a common prefix, wherein each of the groups corresponds to an outgoing port of a next network switch and routing of data is performed per group of virtual connection identifiers;
   allocating means for allocating a virtual connection identifier at an incoming port of the next network switch;
   informing means for informing an outgoing port of a previous network switch of the allocated virtual connection identifier number;
   assigning means for assigning each of the virtual connection identifier groups a unique common prefix; and
   defining means for defining a size of the virtual connection identifier groups based on a length of the unique common prefix.

14. An apparatus comprising:
   arranging means for arranging virtual connection identifiers into groups based on a common prefix, wherein routing of data is performed per group of virtual connection identifiers;
   allocating means for allocating a virtual connection identifier at an incoming port;
   informing means for informing an outgoing port of a previous network switch of the allocated virtual connection identifier number;
   assigning means for assigning each of the virtual connection identifier groups a unique common prefix; and
   defining means for defining a size of the virtual connection identifier groups based on a length of the unique common prefix.

* * * * *